United States Patent
Saitou et al.

(10) Patent No.: US 9,405,138 B2
(45) Date of Patent: Aug. 2, 2016

(54) LIQUID CRYSTAL DISPLAY DEVICE

(71) Applicant: Japan Display Inc., Tokyo (JP)

(72) Inventors: Terunori Saitou, Tokyo (JP); Toshio Miyazawa, Tokyo (JP); Tatsuya Sugita, Tokyo (JP); Shinichiro Oka, Tokyo (JP); Tomohiko Naganuma, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 151 days.

(21) Appl. No.: 14/050,511

(22) Filed: Oct. 10, 2013

(65) Prior Publication Data

US 2014/0104518 A1    Apr. 17, 2014

(30) Foreign Application Priority Data

Oct. 15, 2012    (JP) .................................. 2012-227739

(51) Int. Cl.
| | |
|---|---|
| *G02F 1/1335* | (2006.01) |
| *G02F 1/13* | (2006.01) |
| *G02B 27/22* | (2006.01) |
| *H04N 13/04* | (2006.01) |
| *G02F 1/29* | (2006.01) |

(52) U.S. Cl.
CPC .......... *G02F 1/1313* (2013.01); *G02B 27/2214* (2013.01); *H04N 13/0404* (2013.01); *H04N 13/0454* (2013.01); *G02F 2001/294* (2013.01)

(58) Field of Classification Search
CPC ............ G02F 1/1313; G02F 2001/294; G02B 27/2214; H04N 13/0404; H04N 13/0454
See application file for complete search history.

(56) References Cited

U.S. PATENT DOCUMENTS

| | | | |
|---|---|---|---|
| 5,493,427 A | 2/1996 | Nomura et al. | |
| 2008/0266387 A1 | 10/2008 | Krijn et al. | |
| 2009/0322995 A1* | 12/2009 | Yonemura | G02F 1/134363 349/96 |
| 2010/0238276 A1* | 9/2010 | Takagi et al. | 348/54 |
| 2011/0292306 A1* | 12/2011 | Kim et al. | 349/5 |
| 2012/0242913 A1* | 9/2012 | Miyazawa et al. | 349/5 |
| 2012/0257127 A1* | 10/2012 | Miyazawa | G02F 1/13471 349/15 |
| 2012/0314144 A1* | 12/2012 | Sugita et al. | 349/15 |

FOREIGN PATENT DOCUMENTS

| | | |
|---|---|---|
| JP | 2862462 | 12/1998 |
| JP | 2009-520231 | 5/2009 |

* cited by examiner

*Primary Examiner* — Ryan Crockett
(74) *Attorney, Agent, or Firm* — Typha IP LLC

(57) ABSTRACT

A liquid crystal display device is configured to form a three dimensional image on the vertical view by applying a first voltage between a narrow electrode on the first substrate and a wide electrode on the second substrate, and a second voltage lower than the first voltage between the wide electrode on the first substrate and the wide electrode on the second substrate, and to form a three dimensional image on the horizontal view by applying the first voltage between the wide electrode on the first substrate and a narrow electrode on the second substrate, and the second voltage between the wide electrode on the first substrate and the wide electrode on the second substrate so as to reduce generation of domain in the horizontal electric field.

8 Claims, 10 Drawing Sheets

LIQUID CRYSTAL LENS IN ON STATE

Y—Y
LIQUID CRYSTAL LENS IN OFF STATE

Y-Y
LIQUID CRYSTAL LENS IN ON STATE

X—X
LIQUID CRYSTAL LENS IN OFF STATE

X—X
LIQUID CRYSTAL LENS IN ON STATE

Y-Y
LIQUID CRYSTAL LENS IN OFF STATE

X-X
LIQUID CRYSTAL LENS IN OFF STATE

Y—Y

LIQUID CRYSTAL DISPLAY DEVICE

CLAIM OF PRIORITY

The present application claims priority from Japanese Patent Application JP 2012-227739 filed on Oct. 15, 2012, the content of which is hereby incorporated by reference into this application.

BACKGROUND

The present invention relates to a display device, and in particular, relates to a liquid crystal display device which ensures three dimensional display using a liquid crystal lens.

Generally, a liquid crystal display panel includes a TFT substrate having pixel electrodes and thin film transistors (TFT) arranged in a matrix, and a counter substrate that faces the TFT substrate and has color filters at the positions corresponding to the pixel electrodes of the TFT substrate, and interposes a liquid crystal between the TFT substrate and the counter substrate to form a display region. An image is formed by controlling a transmittance of light through liquid crystal molecules for each pixel. As the liquid crystal is capable of controlling only polarization light, the light from the backlight is polarized by a lower polarizing plate before incidence on the TFT substrate, and is controlled by the liquid crystal layer. It is then polarized by an upper polarizing plate again so as to be externally emitted. As a result, the light is emitted from the liquid crystal display panel as the polarization light.

Various kinds of methods of three dimensionally displaying an image to be formed on the liquid crystal display panel have been proposed. Among all, the method of forming a liquid crystal lens on the liquid crystal display panel especially applied to the compact display device has received attention because of reasons that no special eyeglasses are required for visually identifying the three dimensional image, the method allows switching operations between the two dimensional image and the three dimensional image, and the like.

Japanese Patent No. 2862462 discloses that the liquid crystal lens is configured by interposing liquid crystal molecules between the upper and the lower substrates, forming a strip-like upper substrate electrode pattern on the upper substrate, and a solid planar lower substrate electrode pattern on the lower substrate, and orienting the liquid crystal molecules along the electric field generated by applying a voltage to the upper and the lower electrode patterns.

JP-A-2009-520231 discloses the liquid crystal lens formed by using the electric field generated as the vertical electric field between the upper and the lower substrate electrode patterns. In this case, the upper and the lower substrate electrode patterns are substantially the same except that the pattern on the upper substrate is rotated to be at a right angle to the pattern on the lower substrate. This makes it possible to adjust direction of the lens at 90° using the method of applying the voltage to the upper and the lower substrate electrode patterns so as to allow the three dimensional display on both horizontal and vertical views.

FIGS. 15 to 17 illustrate an outline of a liquid crystal lens 10 and a 3D display using a liquid crystal lens 10. The term "2D display" refers to the two dimensional display, and the term "3D display" refers to the three dimensional display herein. The liquid crystal lens 10 is configured to interpose the liquid crystal between two substrates each having electrodes, and has the same structure as that of the liquid crystal display element. However, unlike application to the liquid crystal display for display purpose, the subject lens is not configured to control the polarizing direction, and accordingly, no polarizing plate is used.

FIG. 15 represents an outline of the electrodes formed on two substrates that interpose the liquid crystal. A laterally long rectangular pattern indicated by a solid line denotes an electrode 31 on a lower substrate 30. A rectangular pattern indicated by a broken line denotes an electrode 21 on an upper substrate 20. Rectangles marked with A, B and the like denote electrode terminals which apply voltage from outside. Lines that connect the electrode terminals and the electrodes on the substrates denote wirings. The electrode connected to the electrode terminal A may be referred to as an electrode A, and the one connected to the electrode terminal B may be referred to as an electrode B herein. In this case, the patterns on the upper and the lower substrates may be inverted because of no essential limitation. However, as it is necessary to transmit light rays, at least the electrode that covers an entire display part is formed using a transparent electrode such as an ITO.

An arrow 40, 41 shown in FIG. 15 indicates rubbing directions of the upper and the lower substrates, which are the same. The liquid crystal to be interposed between those substrates is oriented so that the longitudinal axis is directed to the arrow direction in the state where the voltage is not applied. FIG. 16 is a sectional view taken along line Y-Y of FIG. 15. The electrodes on the lower substrate 30 are set so that two pixels of the liquid crystal display panel below the liquid crystal lens 10 are disposed between two electrodes. Actually, the pitch of the two pixels is not the same as that of the electrodes. Those pitches are appropriately designed in accordance with a possible view point.

FIG. 16 illustrates the state where the upper and the lower electrodes are at the same voltage level, that is, no voltage is applied to the liquid crystal or the liquid crystal lens 10 is in OFF state. In this state, the liquid crystal is overall directed to the orientation direction regulated by rubbing. Then the liquid crystal lens 10 serves as an optically uniform medium with respect to the transmitting light, and no action occurs. That is, the 2D image on the liquid crystal display panel for display purpose is output as it is.

FIG. 17 illustrates the state where the voltage is applied to the upper and lower electrodes of the liquid crystal lens 10, and the orientation direction of the liquid crystal is changed, that is, the liquid crystal lens 10 is in ON state. In this state, likewise the normally operated liquid crystal display panel, the AC voltage is applied in order to prevent deterioration of the liquid crystal. The solid electrode is formed on the upper substrate 20, and the localized electrodes are formed on the lower electrode. Therefore, the electric field applied to the liquid crystal is not uniform in the vertical and horizontal directions shown in the drawing. Then the liquid crystal molecules are radially oriented as illustrated in the drawing along the radial (parabolic) electric field from the lower localized electrodes to the upper solid electrode.

The liquid crystal molecules 50 exhibit a birefringent property. The content of the polarization of passing light in the longitudinal direction (longitudinal axis) is brought into an extraordinary ray with high refractive index. The content in a direction perpendicular to the aforementioned content is brought into an ordinary ray with lower refractive index than the extraordinary ray. The angle defined by the contents may be considered through decomposition into the extraordinary ray content and the ordinary ray content in the same manner as vector decomposition. The lens as illustrated in FIG. 17 may be derived from the birefringent property.

If a polarizing direction 42 of the incident light, that is, the light emitted from a liquid crystal display panel 100 is substantially in parallel with the rubbing direction of the liquid crystal lens 10, the rate between the high refractive index part (extraordinary ray part) and the low refractive index part of the incident light upon its passage through the liquid crystal lens 10 may vary depending on the location.

The broken line indicating an interface of a convex lens 11 illustrated in FIG. 17 schematically shows the interface between the high refractive index part and the low refractive index part. The resultant lens provides the same effect as that of the convex lens in the liquid crystal. Under the effect of the convex lens, when two pixels of the liquid crystal display panel 100 are provided as shown in FIG. 17, the light ray from a first pixel 200 mainly changes its path toward the upper right side, and the light ray from a second pixel 300 mainly changes its path toward the upper left side. Referring to FIG. 17, each of codes r, g and b of the first pixel 200 and the second pixel 300 will herein denote a red sub-pixel, a green sub-pixel, and a blue sub-pixel, respectively. The light ray from the first pixel 200 may be guided to a right eye and the light ray from the second pixel 300 may be guided to a left eye of an observer by displaying signals of the first pixel 200 and the second pixel 300 for right and left eyes, respectively through appropriate design of the liquid crystal lens 10 and the liquid crystal display panel 100. The resultant image may be identified as the 3D image by the observer.

SUMMARY

Meanwhile, the function that allows switching of the display mode between the portrait (vertical) view and the landscape (horizontal) view has been added to be used for the recent liquid crystal display device of a mobile phone, for example. The panel for display in 3D has demanded the function for switching the mode between vertical and horizontal views so as to be adapted to the aforementioned usage. The generally employed method may display the normal 3D image on the vertical view, but fails to display the sufficient 3D view on the horizontal view. Conversely, although the 3D image is normally displayed on the horizontal view, sufficient 3D image cannot be displayed on the vertical view.

The present invention provides the structure which forms the liquid crystal lens to ensure display of normal images both on the vertical and horizontal views.

According to an aspect of the present invention, a liquid crystal display device has a liquid crystal lens formed on a liquid crystal display panel, capable of providing a vertical view and a horizontal view. The liquid crystal lens is configured to interpose a liquid crystal between a first substrate and a second substrate. A first electrode with small width and a second electrode with large width are extensively provided on the first substrate in a first direction. A third electrode with small width and a fourth electrode with large width are extensively provided on the second substrate in a second direction. A first voltage is applied between the electrode with small width on the first substrate and the electrode with large width on the second substrate, and a second voltage lower than the first voltage is applied between the electrode with large width on the first substrate and the electrode with large width on the second substrate so that a three dimensional image is formed on the vertical view. The first voltage is applied between the electrode with large width on the first substrate and the electrode with small width on the second substrate, and the second voltage is applied between the electrode with large width on the first substrate and the electrode with large width on the second substrate so that the three dimensional image is formed on the horizontal view.

According to another aspect of the present invention, a liquid crystal display device has a liquid crystal lens formed on a liquid crystal display panel, capable of providing a vertical view and a horizontal view. The liquid crystal lens is configured to interpose a liquid crystal between a first substrate and a second substrate. A first electrode with small width, a second electrode in parallel with the first electrode, and a third electrode with large width in parallel with the second electrode are extensively formed on the first substrate in a first direction. A fourth electrode with small width, a fifth electrode in parallel with the first electrode, and a sixth electrode with large width in parallel with the fifth electrode are extensively formed on the second substrate in a second direction. A first voltage is applied between the first electrode on the first substrate and the sixth electrode on the second substrate, a second voltage is applied between the second electrode on the first substrate and the sixth electrode on the second substrate, and a third voltage is applied between the third electrode on the first substrate and the sixth electrode on the second substrate so as to form a three dimensional image on the vertical view. The first voltage is applied between the third electrode on the first substrate and the fourth electrode on the second substrate, the second voltage is applied between the third electrode on the first substrate and the fifth electrode on the second substrate, and the third voltage is applied between the third electrode on the first substrate and the sixth electrode on the second substrate so as to form the three dimensional image on the horizontal view. The first, the second and the third voltages establish a relationship of the first voltage>second voltage>third voltage.

The present invention provides the 3D display device configured to form the liquid crystal lens which allows display of 3D images by switching the display mode between the portrait (vertical) view and the landscape (horizontal) view. The display device makes it possible to reduce distortion of the liquid crystal lens, which is caused by domain in the horizontal electric field.

DESCRIPTION OF THE PREFERRED EMBODIMENTS

The present invention will be described in detail in reference to the following examples.

First Example

Figure 1:
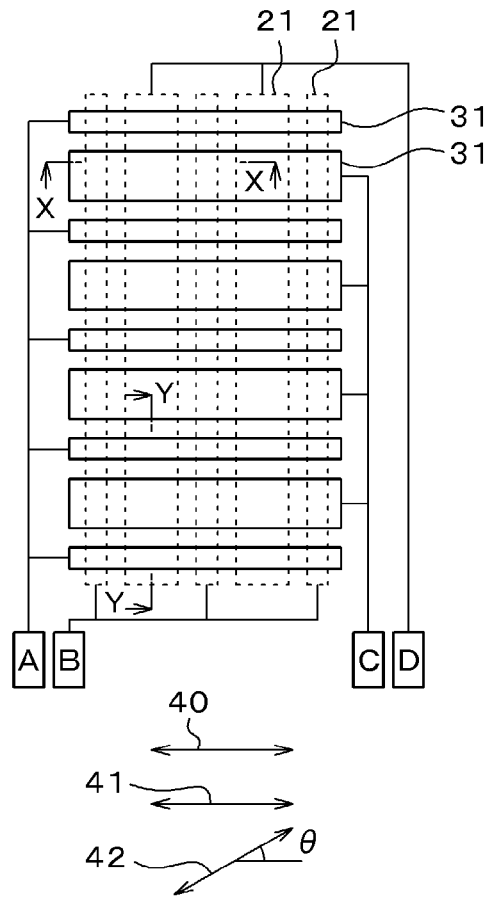
FIG. 1 is a plan view illustrating electrodes of a 3D image display device according to a first example.

FIG. 1 is a plan view illustrating an electrode configuration of a liquid crystal lens 10 according to the present invention, allowing switching of the display mode between vertical and horizontal views. The solid line indicates a lower substrate electrode pattern 31, and a broken line indicates an upper substrate electrode pattern 21. Each of an upper substrate 20 and a lower substrate 30 includes narrow electrodes as localized electrodes and wide electrodes each serving as a solid electrode on the counter substrate relative to the narrow electrodes. Codes A, B, C and D denote terminal electrodes for applying voltage to the respective electrode patterns. The codes A, B, C and D will also refer to the corresponding electrodes.

Referring to FIG. 1, an arrow 40 denotes a rubbing direction of the upper substrate 20, and an arrow 41 denotes a rubbing direction of the lower substrate 30. The rubbing direction 40 of the upper substrate 20 is in the same direction as the rubbing direction 41 of the lower substrate 30. The liquid crystal molecules are oriented homogeneously. An arrow 42 denotes a polarizing direction of an upper polarizing plate of a liquid crystal display panel 100 which is provided on a back surface of the liquid crystal lens 10. The polarizing direction of the upper polarizing plate is inclined at an angle of θ with respect to the rubbing direction 41 of the lower substrate.

The best utilization efficiency of light may be obtained by making the polarizing direction of the upper polarizing plate of the liquid crystal display panel 100 coincided with the rubbing direction 41 of the lower substrate 30 of the liquid crystal lens 10. However, the liquid crystal display panel 100 is configured to define a predetermined angle by the direction of a scanning line or a video signal line and the rubbing direction 41 so as to prevent generation of domain. Meanwhile, as the rubbing directions of the upper substrate 20 and the lower substrate 30 of the liquid crystal lens 10 according to the present invention are in the horizontal direction, and accordingly, the polarizing direction is inclined at the angle of θ with respect to the rubbing direction 41 of the lower substrate 30. As for the structure illustrated in FIG. 1, the efficiency of the liquid crystal lens 10 is prioritized although the light utilization efficiency is deteriorated owing to difference between the polarizing direction 42 of the upper polarizing plate and the rubbing direction 41 of the lower substrate 30 of the liquid crystal lens 10.

Figure 2:
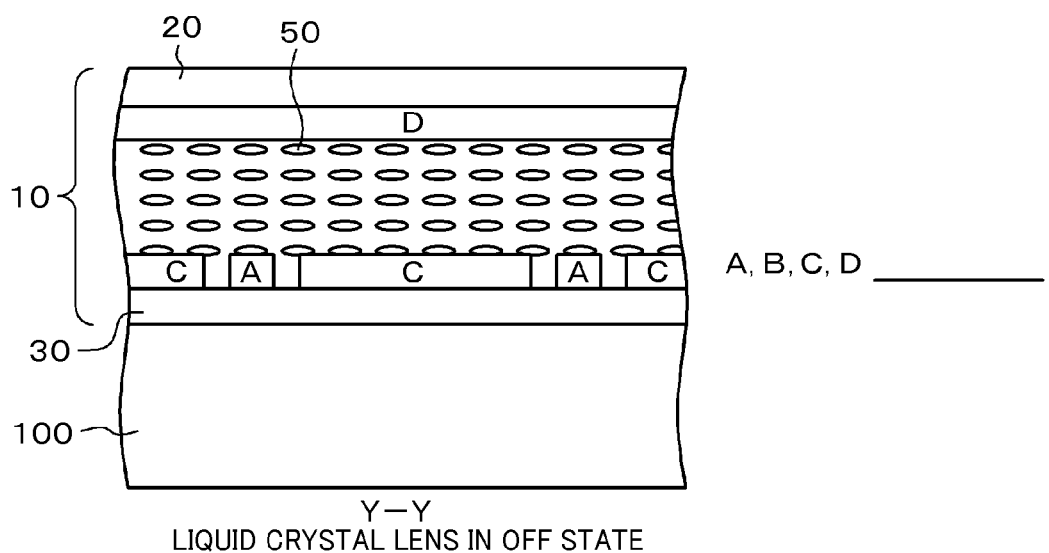
FIG. 2 illustrates an orientation of liquid crystal molecules of a liquid crystal lens when displaying in 2D on a vertical view.
Figure 3:
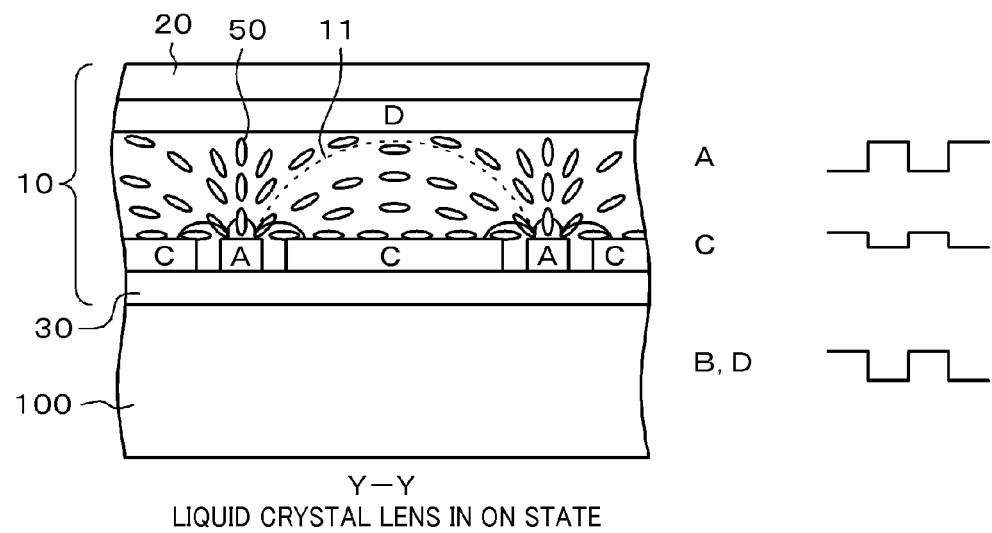
FIG. 3 illustrates the orientation of the liquid crystal molecules of the liquid crystal lens when displaying in 3D on the vertical view.
Figure 16:
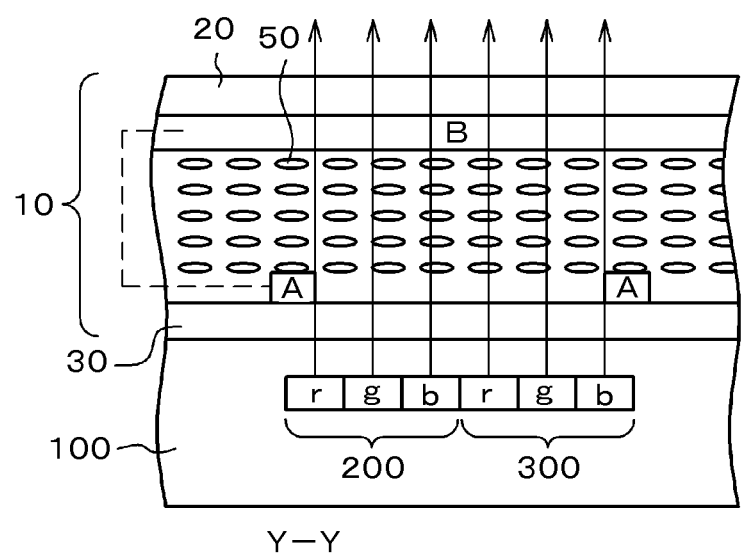
FIG. 16 illustrates the orientation of the liquid crystal molecules in the state where the liquid crystal lens is not formed in the electrode pattern shown in FIG. 15.
Figure 17:
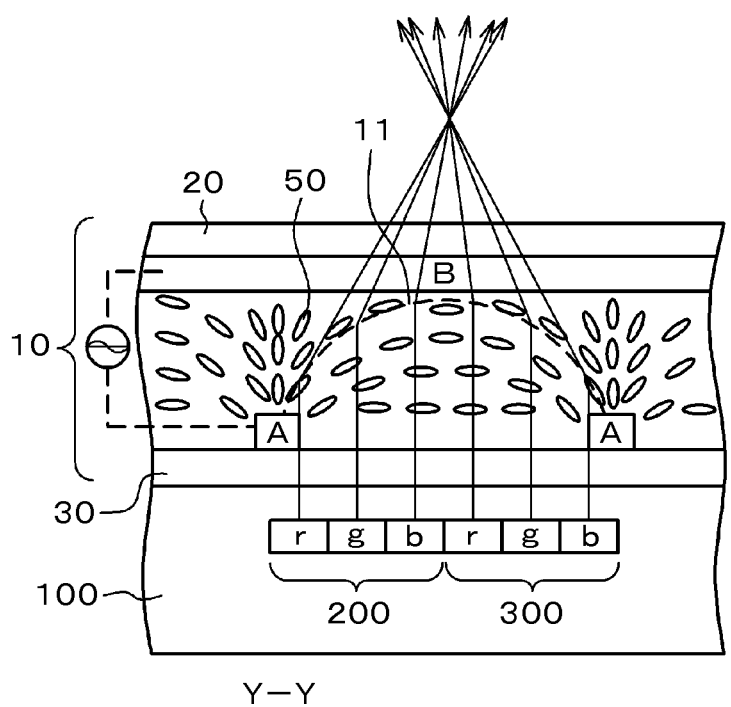
FIG. 17 illustrates the orientation of the liquid crystal molecules in the state where the liquid crystal lens is formed in the electrode pattern shown in FIG. 15.

FIGS. 2 and 3 are sectional views taken along line Y-Y of FIG. 1. In reference to FIG. 1, FIGS. 2 and 3 are sectional views representing formation of the cylindrical liquid crystal lens 10 when the 3D image is visually identified on the horizontal view. In the process of forming the liquid crystal lens, substantially the same phenomenon occurs as explained referring to FIGS. 16 and 17, allowing the liquid crystal lens 10 to provide its function.

Referring to FIG. 3, the liquid crystal lens 10 is formed between the electrodes A on the lower substrate 30 and the electrodes D on the upper substrate 20. There exists a wide electrode C between the electrodes A, A on the lower substrate 30, which serves as the solid electrode when the image is seen on the vertical view. Then the horizontal electric field is generated between the electrodes A and C, which generates the domain in the liquid crystal layer. This may give an adverse influence on the liquid crystal lens 10. As for the general case, the same voltage is applied to the electrodes D and C, and the resultant influence of the horizontal electric field is strong. This may increase the generated domain, resulting in large adverse influence on the liquid crystal lens 10.

Meanwhile, the present invention is configured to reduce the voltage generated between the electrodes A and C to be lower than the voltage generated between the electrodes A and D for forming the liquid crystal lens 10 so as to allow formation of the normal liquid crystal lens 10 by suppressing the influence of the horizontal electric field on the liquid crystal lens 10.

Referring to FIG. 3, the liquid crystal is alternately driven by a pulse waveform. Pulses with the same peak values and phases different by the angle of 180° are applied between the electrodes A and D to form the liquid crystal lens 10. Meanwhile, the voltage with the peak value lower than that of the electrode D and the same phase as that of the electrode D is applied to the electrode C. As the peak value of the pulse applied to the electrode C is smaller than the peak value of the pulse applied to the electrode A or D, the influence of the horizontal electric field is small. This makes it possible to suppress the influence on the liquid crystal lens 10.

Figure 4:
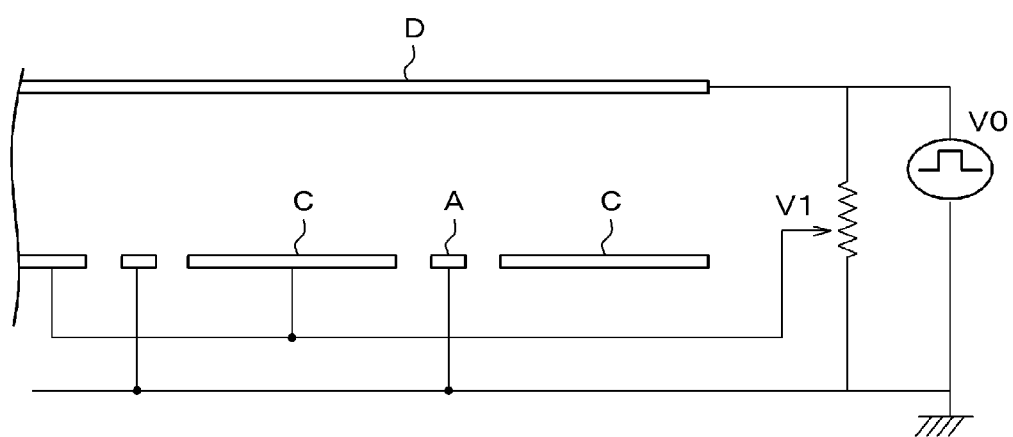
FIG. 4 illustrates an example of voltage application to the respective electrodes when displaying in 3D on the vertical view.

As for the configuration of the electrodes illustrated in FIG. 3, the electrode A has the width ranging from 6 to 10 μm, and the electrode C has the width of 130 μm. The distance between the electrodes A and C ranges from 4 to 20 μm. FIG. 4 is a circuit diagram schematically showing an example of the voltage applied to the respective electrodes illustrated in FIG. 3. For the purpose of simplifying the explanation, it is assumed that the electrode A is grounded and the pulse voltage is applied to the electrode D as FIG. 4 illustrates.

Referring to FIG. 4, for example, the voltage (V0=5V) is applied to the electrode D, and the voltage (V1=1.5V) is applied to the electrode C. Accordingly, the electric field generated between the electrodes A and C is made lower than the general case by 3.5/5 (70%). As the electric field generated between the electrodes C and D distorts the liquid crystal lens 10, the voltage applied to the electrode C may be determined in consideration of the distortion of the liquid crystal lens 10 in the horizontal electric field, and the distortion of the liquid crystal lens caused by the electric field generated between the electrodes C and D.

Figure 5:
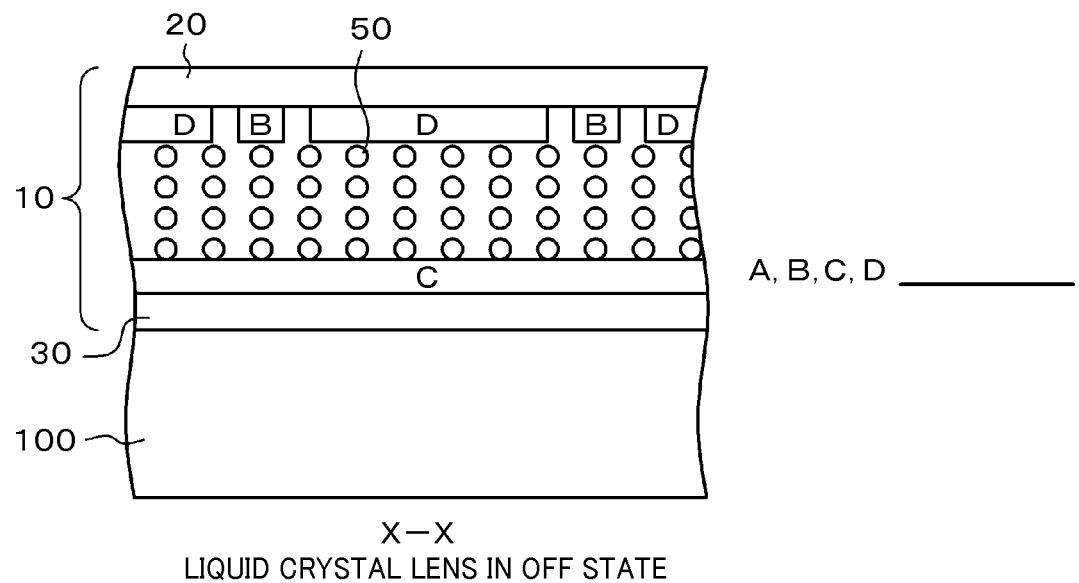
FIG. 5 illustrates the orientation of the liquid crystal molecules of the liquid crystal lens when displaying in 2D on a horizontal view.
Figure 6:
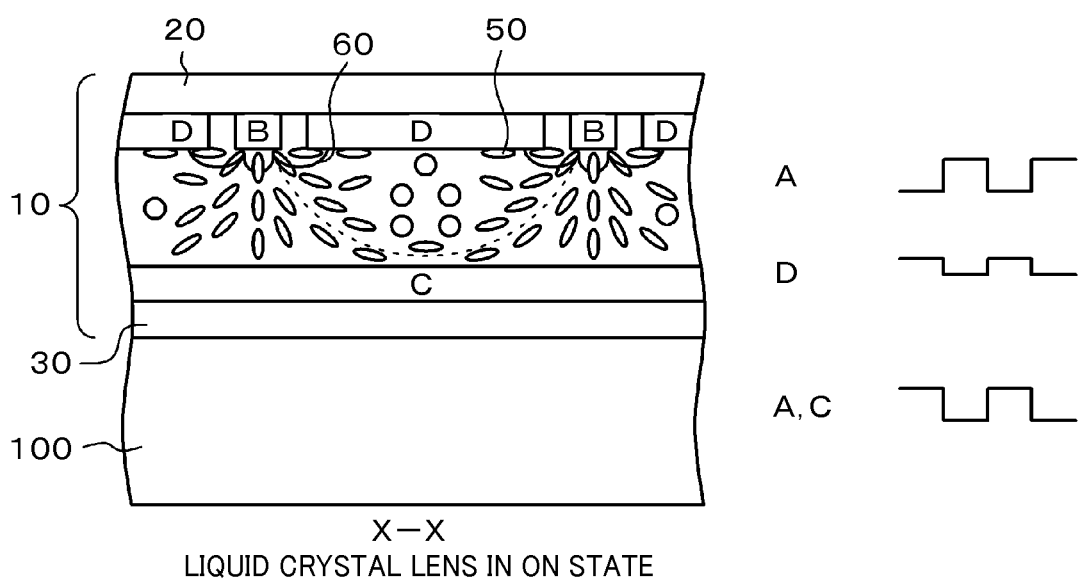
FIG. 6 illustrates the orientation of the liquid crystal molecules of the liquid crystal lens when displaying in 3D on the horizontal view.

FIGS. 5 and 6 are sectional views taken along line X-X of FIG. 1, illustrating formation of the cylindrical liquid crystal lens 10 when the 3D image is observed on the vertical view. FIG. 5 illustrates the orientation direction of the liquid crystal molecules when no voltage is applied to the respective electrodes. Specifically, they are oriented in the direction perpendicular to the drawing. In this case, as the light emitted from the liquid crystal display panel is not influenced by the liquid crystal lens, the 2D image is displayed.

FIG. 6 illustrates that the voltage is applied to form the liquid crystal lens 10 between the electrode B on the upper substrate 20 and the electrode C on the lower substrate 30. As FIG. 6 illustrates, in this case, the downward convex liquid crystal lens 10 is formed. As a characteristic of the present invention, the voltage is applied to the electrode D on the upper substrate 20, which is more approximate to the one applied to the electrode B than the same voltage as applied to the electrode C on the lower substrate 30. Referring to FIG. 6, the peak value of the pulse applied to the electrodes A and C is the same as the peak value of the pulse applied to the electrode B. However, the phase is inverted. Meanwhile, the peak value of the pulse applied to the electrode D is smaller than the peak value of the pulse applied to the electrode B, and the phase is also inverted.

Referring to FIG. 6, the domain is generated in the horizontal electric field between the electrodes B and D. As a potential difference between the electrodes B and D is smaller than the general case, the domain generated in the horizontal electric field is smaller than the one in the general case as well. Accordingly, it is possible to reduce the influence of the horizontal electric field on the liquid crystal lens 10.

Figure 7:
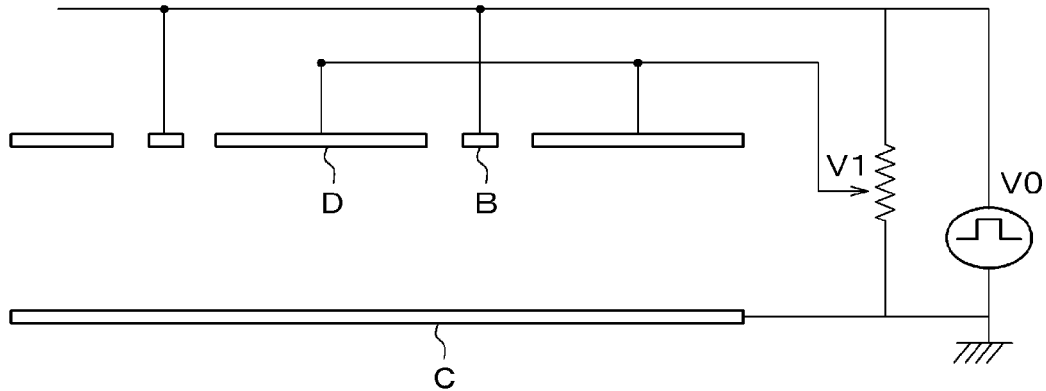
FIG. 7 illustrates an example of voltage application to the respective electrodes when displaying in 3D on the horizontal view.

FIG. 7 is a circuit diagram schematically illustrating an example of the voltage applied to the respective electrodes shown in FIG. 6. For the purpose of simplifying the explanation, it is assumed that the electrode C is grounded and the pulse voltage is applied to the electrode B as FIG. 7 illustrates.

Referring to FIG. 7, the voltage (V0=5V) is applied to the electrode B, and the voltage (V1=1.5V) is applied to the electrode D. Accordingly, the electric field between the electrodes B and D is reduced to be smaller than the general case by 70% (3.5/5). Meanwhile, the liquid crystal lens is distorted owing to the electric field generated between the electrodes D and C. The voltage applied to the electrode D may be determined in consideration of the distortion of the liquid crystal lens in the horizontal electric field, and the distortion of the liquid crystal lens caused by the electric field generated between the electrodes D and C.

As described above, this example is configured to reduce the influence of the horizontal electric field generated on the same substrate both on the vertical and the horizontal views so as to make the distortion of the liquid crystal lens small. This makes it possible to form the improved 3D image.

Second Example

Figure 8:
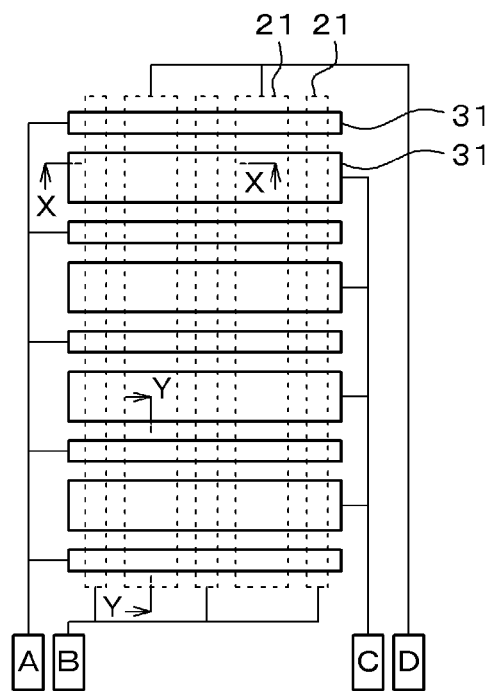
FIG. 8 is a plan view illustrating electrodes of a 3D image display device according to a second example.
Figure 8:
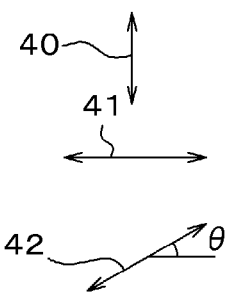

FIG. 8 is a plan view illustrating the electrode configuration of the liquid crystal lens 10 according to a second example, allowing switching of the display mode between the vertical and horizontal views. The electrode configuration illustrated in FIG. 8 is the same as the one illustrated in FIG. 1 except that the rubbing direction 40 of the upper substrate 20 is at a right angle to the rubbing direction 41 of the lower substrate 30. That is, the liquid crystal lens of this example has a TN (Twisted Nematic) configuration as a feature different from that of the first example. Referring to FIG. 1, the reason why the rubbing direction of the lower substrate 30 deviates from the polarizing direction of the upper polarizing plate of the liquid crystal display panel 100 by the angle of θ is similar to the one as described in the first example.

Figure 9:
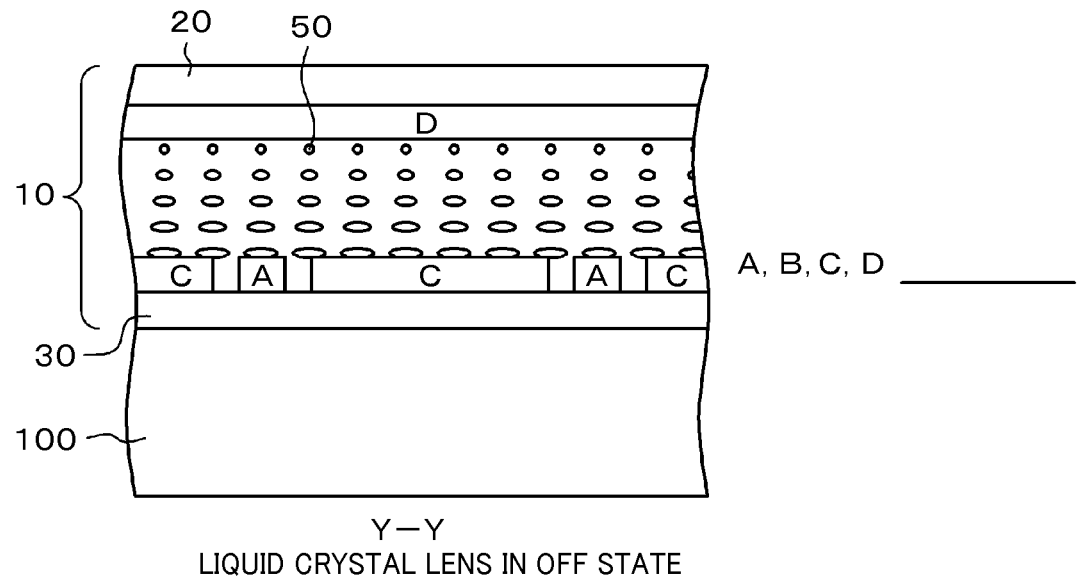
FIG. 9 illustrates the orientation of the liquid crystal molecules of the liquid crystal lens when displaying in 2D on the vertical view according to the second example.

FIG. 9 is a sectional view taken along line Y-Y of FIG. 8 representing that no voltage is applied to the respective electrodes. As there is a difference in the rubbing direction between the lower substrate 30 and the upper substrate 20 of the liquid crystal lens 10 by the angle of 90°, the liquid crystal molecules 50 are rotated at 90° between the lower substrate 30 and the upper substrate 20. In this state, as the light emitted from the liquid crystal display panel 100 is not influenced by the liquid crystal lens 10, the 2D image is formed.

The liquid crystal lens 10 similar to the one illustrated in FIG. 3 is formed by applying the voltage between the electrodes A and D as illustrated in FIG. 8. Likewise the first example, the voltage more approximate to the one applied to the electrode A than the one applied to the electrode D is applied to the electrode C. In other words, the voltage is applied to the respective electrodes in the similar manner to the first example. The circuit diagram schematically illustrating the example of applying the voltage to the respective electrodes is also similar to the diagram as FIG. 4 illustrates.

Figure 10:
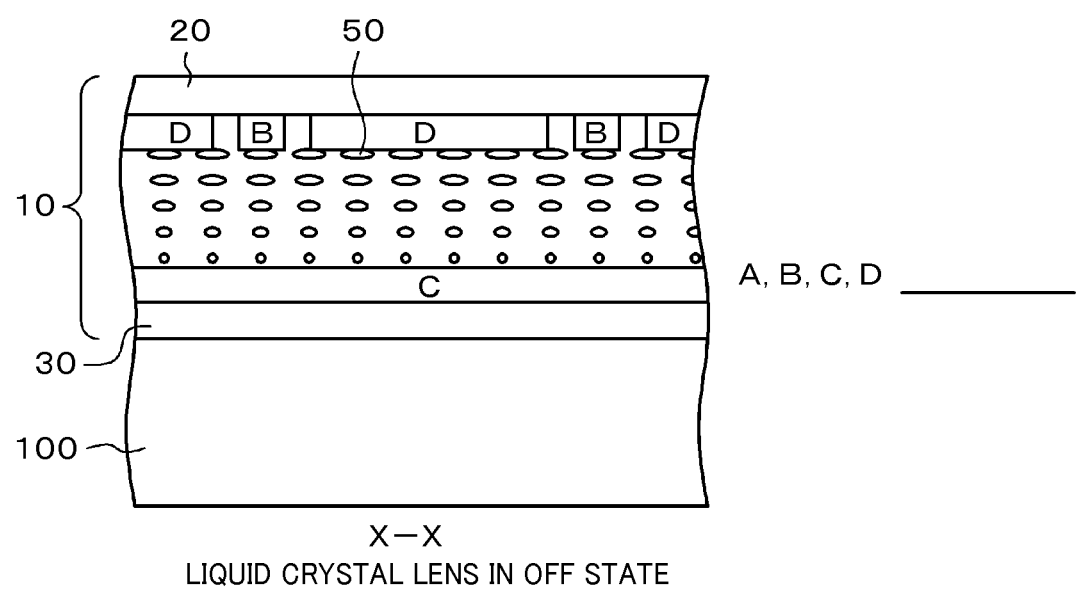
FIG. 10 illustrates the orientation of the liquid crystal molecules of the liquid crystal lens when displaying in 2D on the horizontal view according to the second example.

FIG. 10 is a sectional view taken along line X-X of FIG. 8, representing the state where no voltage is applied to the respective electrodes. As there is a difference in the rubbing direction between the lower substrate 30 and the upper substrate 20 of the liquid crystal lens 10 by the angle of 90°, the liquid crystal molecules 50 are rotated at 90° between the lower substrate 30 and the upper substrate 20. In this state, as the light emitted from the liquid crystal display panel 100 is not influenced by the liquid crystal lens 10, the 2D image is formed.

The liquid crystal lens 10 like the downward convex lens illustrated in FIG. 6 is formed by applying the voltage between the electrodes B and C as shown in FIG. 8. Likewise the first example, the voltage more approximate to the one applied to the electrode C than the one applied to the electrode B is applied to the electrode D. In other words, the voltage that is the same as the one described in the first example is applied to the respective electrodes. The circuit diagram schematically representing the example of the voltage application to the respective electrodes is also similar to the diagram shown in FIG. 7.

Third Example

Figure 11A:
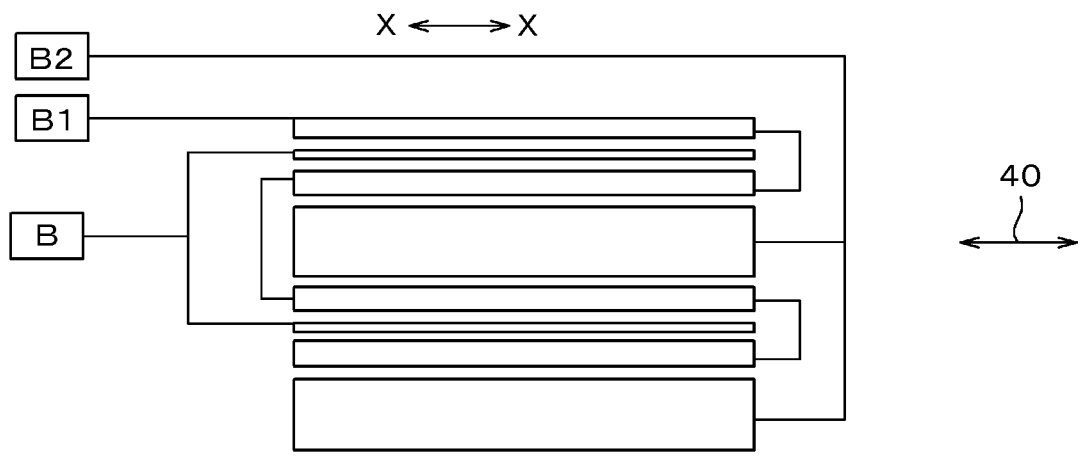
FIGS. 11A and 11B are plan views illustrating an upper substrate electrode pattern and a lower substrate electrode pattern according to a third example.
Figure 11B:
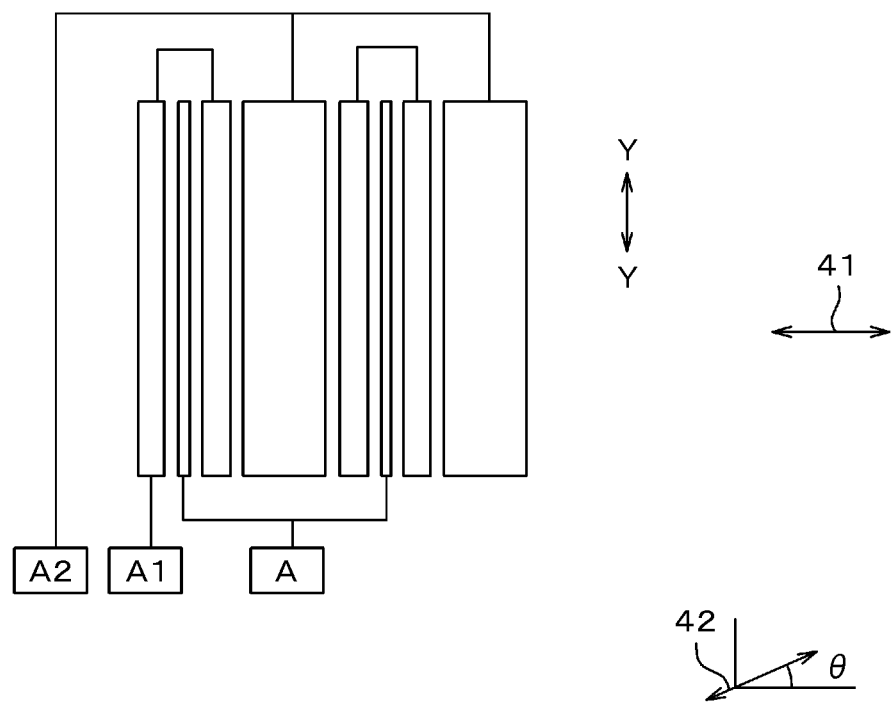

FIGS. 11A and 11B are plan views illustrating the electrodes 21 on the upper substrate 20 and the electrodes 31 on the lower substrate 30 of the liquid crystal lens for forming the 3D image according to a third example. FIG. 11A represents the upper electrode pattern 21, and FIG. 11B represents the lower electrode pattern 31. Unlike FIGS. 1 and 8, FIGS. 11A and 11B separately illustrate the upper electrode pattern 21 and the lower electrode pattern 31. Extending directions of the upper electrode pattern 21 and the lower electrode pattern 31 are opposite to those described in the first and the second examples. FIGS. 11A and 11B illustrate the liquid crystal lens of so called homogeneous type having the rubbing direction 40 of the upper substrate 20 coincided with the rubbing direction 41 of the lower substrate 30. There exists a difference between the polarizing direction of the upper polarizing plate of the liquid crystal display panel 100 and the rubbing direction 41 of the lower substrate 30 of the liquid crystal lens 10 by the angle of θ because of the same reason as described in the first example.

Referring to FIGS. 11A and 11B, the liquid crystal lens 10 is formed to provide the vertical view by applying the voltage between the electrode A of the lower electrode pattern 31 illustrated in FIG. 11B and the electrode B2 of the upper electrode pattern 21 illustrated in FIG. 11A. In this example, relatively narrow electrodes A1 and the relatively wide electrode A2 are arranged between the electrodes A, A. The voltage applied to the electrodes A1 and A2 is different from the one applied to the electrode A.

Figure 12:
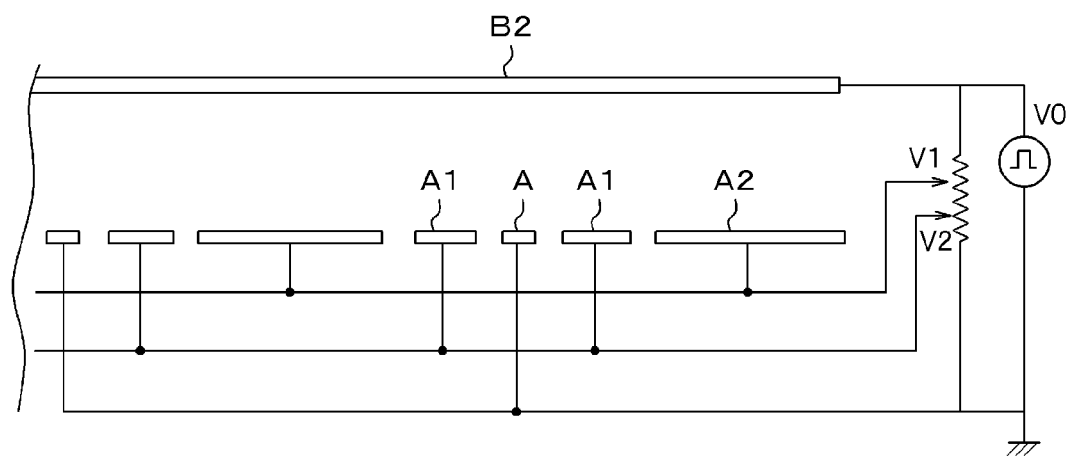
FIG. 12 illustrates an example of voltage application to the respective electrodes when displaying in 3D on the vertical view according to the third example.

FIG. 12 schematically illustrates the method of applying the voltage for forming the 3D image on the vertical view, corresponding to the sectional view taken along line X-X of FIG. 11A. For the purpose of simplifying the explanation, it is assumed that the electrode A on the lower substrate 30 is grounded, and the pulse is applied to the electrode B2 on the upper substrate 20 as FIG. 12 illustrates so as to form the upward convex liquid crystal lens. On the lower substrate 30, the voltage applied to the electrodes A1, A1 which interpose the electrode A is higher than the voltage applied to the electrode A. The voltage applied to the electrode A2 adjacent to the electrode A1 is further higher than the voltage applied to the electrode A1. As FIG. 12 illustrates, for example, the voltage (V0=5V) is applied to the electrode B2, the voltage (V2=3.5V) is applied to the electrode A1, and the voltage (V1=4.5V) is applied to the electrode A2.

In the first example, the wide electrode C only exists between the electrodes A, A as shown in FIG. 4. The voltage applied to the wide electrode C is higher than the voltage applied to the electrode A. This makes it possible to reduce the domain in the horizontal electric field to be smaller than the general case. In this example, the wide electrode is divided into the electrodes A1 and A2 so that the voltage is divided into those applied between the electrodes A and A1, and between the electrode A1 and A2. This may further reduce the horizontal electric field. Accordingly, the generated domain in the horizontal electric field may be made smaller than the one as described in the first or the second example.

Referring to FIGS. 11A, 11B and 12, the electrode A has the width ranging from 6 to 10 µm, and the electrode A2 has the width of 100 µm, for example. The width of the electrode A1 may be determined in consideration of the width corresponding to the two pixels, and each width of the electrodes A and A2. The distance between the electrodes A and A1 ranges from 5 to 20 µm, and the distance between the electrodes A1 and A2 ranges from 3 to 15 µm, for example.

Figure 13:
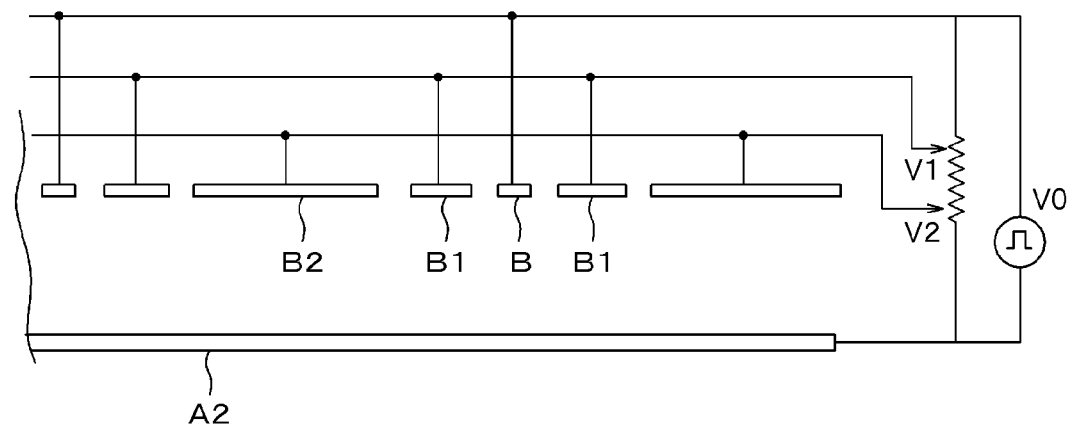
FIG. 13 illustrates an example of voltage application to the respective electrodes when displaying in 3D on the horizontal view according to the third example.

FIG. 13 schematically represents the method of applying the voltage for forming the 3D image on the horizontal view, corresponding to the sectional view taken along line Y-Y of FIG. 11B. For the purpose of simplifying the explanation, it is assumed that the electrode A2 on the lower substrate 30 is grounded, and the pulse is applied to the electrode B1 on the upper substrate 20 as FIG. 13 illustrates so as to form the downward convex liquid crystal lens 10. On the upper substrate 20, the voltage (V0=5V) is applied to the electrode B, and the voltage (V1=1.5V) is applied to the electrodes B1, B1 that interpose the electrode B, for example. The voltage applied to the electrode B2 adjacent to the electrode B1 is lower than the voltage applied to the electrode B1, that is, 0.5V, for example.

Likewise FIG. 12, FIG. 13 illustrates that the wide electrode is divided into the electrodes B1 and B2 so that the voltage is divided into those applied between the electrodes B and B1, and between the electrodes B1 and B2. This may further reduce the horizontal electric field. Accordingly, the generated domain in the horizontal electric field may be made smaller than the one described in the first or the second example.

Referring to FIGS. 11A and 13, the width of the electrode B has the width ranging from 6 to 10 µm, and the electrode B2 has the width of 100 µm, for example. The width of the electrode B1 may be determined in consideration of the width corresponding to the two pixels of the liquid crystal display panel and each width of the electrodes B and B2. The distance between the electrodes B and B1 ranges from 5 to 20 µm, and the distance between the electrodes B1 and B2 ranges from 3 to 15 µm, for example.

Values of the voltages V1 and V2 shown in FIGS. 12 and 13 may be determined in consideration of the degree of distortion of the liquid crystal lens resulting from application of the voltages V1 and V2 to the electrodes as well as generation of the domain in the horizontal electric field. As described above, this example is capable of reducing intensity of the horizontal electric field to be lower than the one described in the first and the second examples, and further suppressing generation of the domain in the horizontal electric field.

Fourth Example

Figure 14A:
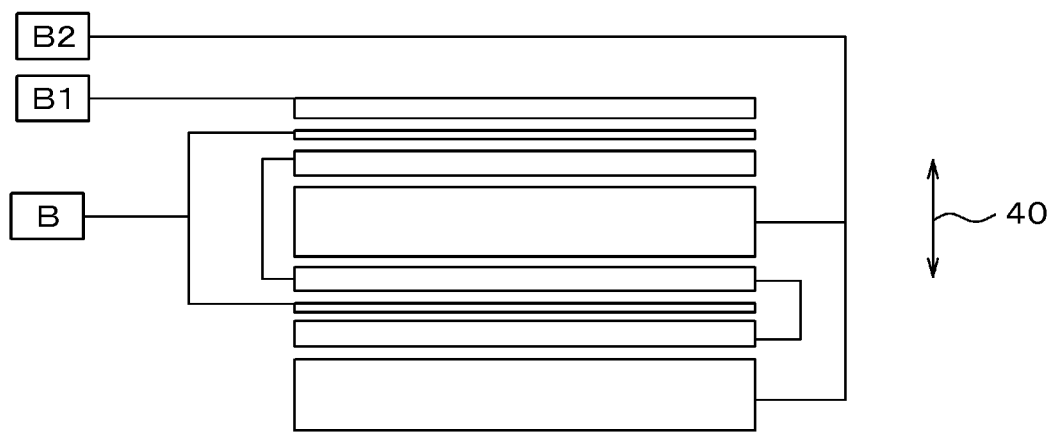
FIGS. 14A and 14B are plan views illustrating the upper substrate electrode pattern and the lower substrate electrode pattern according to a fourth example.
Figure 14B:
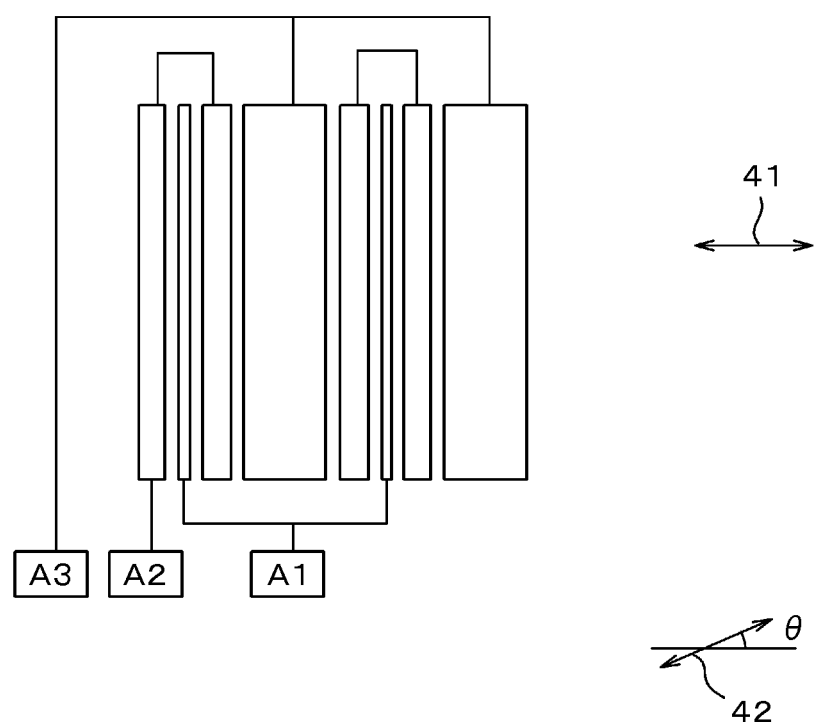
Figure 15:
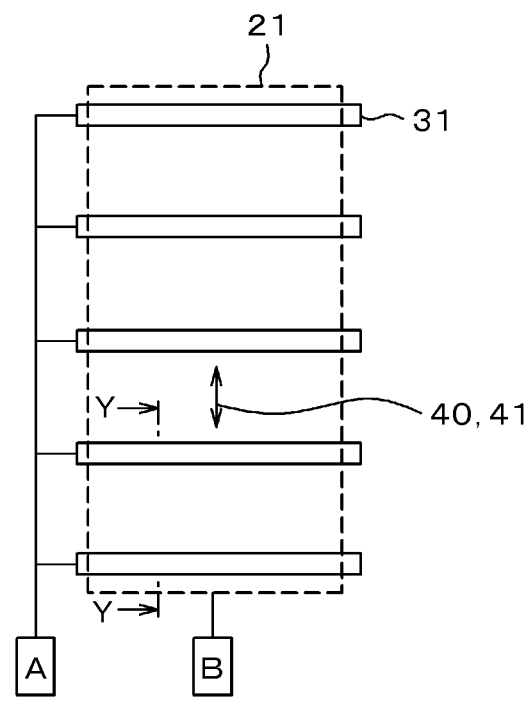
FIG. 15 is a plan view illustrating the upper substrate electrode pattern and the lower substrate electrode pattern representing a basic structure of the liquid crystal lens.

FIGS. 14A and 14B are plan views illustrating the electrode pattern 21 on the upper substrate 20 and the electrode pattern 31 on the lower substrate 30 according to a fourth example. The arrangement of the electrodes illustrated in FIGS. 14A and 14B is the same as the third example illustrated in FIGS. 11A and 11B except that the rubbing direction 40 of the upper substrate 20 deviates from the rubbing direction 41 of the lower substrate 30 by the angle of 90°. That is, as FIGS. 14A and 14B illustrate, the liquid crystal of TN type is employed for forming the liquid crystal lens 10. The polarizing direction of the upper polarizing plate of the liquid crystal display panel 100 deviates from the rubbing direction of the lower substrate 30 of the liquid crystal lens 10 by the angle of θ for the same reason as described in the first example.

FIGS. 14A and 14B are the same as FIGS. 11A and 11B according to the third example except that the liquid crystal lens 10 has the configuration of TN type. The method of applying the voltage to the respective electrodes, each width of the electrodes, each distance between the electrodes and the like are the same as those described in the third example, and accordingly, the explanations will be omitted. Likewise the third example, this example is capable of suppressing generation of the domain in the horizontal electric field as well as reducing the distortion of the liquid crystal lens owing to the domain.

What is claimed is:

1. A liquid crystal display device having a liquid crystal lens formed on a liquid crystal display panel, capable of providing a vertical view and a horizontal view, wherein:
the liquid crystal lens is configured to interpose a liquid crystal between a first substrate and a second substrate;
a plurality of first electrodes with small width and a plurality of second electrodes with large width are extensively provided on the first substrate in a first direction;
the first electrodes and the second electrodes are disposed alternatively in a second direction with no other electrodes in between;
a plurality of third electrodes with small width and a plurality of fourth electrodes with large width are extensively provided on the second substrate in the second direction;
the third electrodes and the fourth electrodes are disposed alternatively in the first direction with no other electrodes in between;

a first voltage is applied between the electrodes with small width on the first substrate and the electrodes with large width on the second substrate, and a second voltage, which is greater than zero and less than the first voltage, is applied between the electrodes with large width on the first substrate and the electrodes with large width on the second substrate so that a three dimensional image is formed on the vertical view;

the first voltage is applied between the electrodes with large width on the first substrate and the electrodes with small width on the second substrate, and the second voltage, which is greater than zero and less than the first voltage, is applied between the electrodes with large width on the first substrate and the electrodes with large width on the second substrate so that the three dimensional image is formed on the horizontal view.

2. The liquid crystal display device according to claim 1, wherein:

the first substrate of the liquid crystal lens has a rubbing direction in the first direction; and the liquid crystal display panel includes an upper polarizing plate so as to form a predetermined angle, which is greater than zero, between a polarizing direction of the upper polarizing plate of the liquid crystal display panel and the first direction.

3. The liquid crystal display device according to claim 2, wherein the second substrate has a rubbing direction in the second direction.

4. The liquid crystal display device according to claim 2, wherein the second substrate has a rubbing direction in the first direction.

5. A liquid crystal display device having a liquid crystal lens formed on a liquid crystal display panel, capable of providing a vertical view and a horizontal view, wherein:

the liquid crystal lens is configured to interpose a liquid crystal between a first substrate and a second substrate;

a plurality of first electrodes with small width, a plurality of second electrodes in parallel with the first electrodes, and a plurality of third electrodes with large width in parallel with the second electrodes are extensively formed on the first substrate in a first direction;

sets comprising one of the first electrodes, one of the second electrodes, one of the third electrodes, and another one of the second electrodes in that order are arranged in a second direction with no other electrodes in between;

a plurality of fourth electrodes with small width, a plurality of fifth electrodes in parallel with the first electrodes, and a plurality of sixth electrodes with large width in parallel with the fifth electrodes are extensively formed on the second substrate in the second direction;

sets comprising one of the fourth electrodes, one of the fifth electrodes, one of the sixth electrodes, and another one of the fifth electrodes in that order are arranged in the first direction with no other electrodes in between;

a first voltage is applied between the first electrodes on the first substrate and the sixth electrodes on the second substrate, a second voltage is applied between the second electrodes on the first substrate and the sixth electrodes on the second substrate, and a third voltage is applied between the third electrodes on the first substrate and the sixth electrodes on the second substrate so as to form a three dimensional image on the vertical view;

the first voltage is applied between the third electrodes on the first substrate and the fourth electrodes on the second substrate, the second voltage is applied between the third electrodes on the first substrate and the fifth electrodes on the second substrate, and the third voltage is applied between the third electrodes on the first substrate and the sixth electrodes on the second substrate so as to form the three dimensional image on the horizontal view;

the third voltage is greater than zero, the second voltage is greater than zero, and the first, the second and the third voltages establish a relationship of the first voltage>the second voltage>the third voltage.

6. The liquid crystal display device according to claim 5, wherein:

the first substrate of the liquid crystal lens has a rubbing direction in the first direction; and the liquid crystal display panel includes an upper polarizing plate so as to form a predetermined angle, which is greater than zero, between a polarizing direction of the upper polarizing plate of the liquid crystal display panel and the first direction.

7. The liquid crystal display device according to claim 6, wherein the second substrate has a rubbing direction in the second direction.

8. The liquid crystal display device according to claim 6, wherein the second substrate has a rubbing direction in the first direction.

* * * * *